(12) United States Patent
Sakata et al.

(10) Patent No.: US 6,866,476 B2
(45) Date of Patent: Mar. 15, 2005

(54) ANTIFRICTION BEARING UNIT AND WATER PUMP

(75) Inventors: Yoshizumi Sakata, Ikoma-gun (JP); Michiru Ueda, Kashiba (JP)

(73) Assignee: Koyo Seiko Co., Ltd, Osaka (JP)

( * ) Notice: Subject to any disclaimer, the term of this patent is extended or adjusted under 35 U.S.C. 154(b) by 0 days.

(21) Appl. No.: 10/156,232

(22) Filed: May 29, 2002

(65) Prior Publication Data

US 2002/0182066 A1 Dec. 5, 2002

(30) Foreign Application Priority Data

May 31, 2001 (JP) ........................................ 2001-163612
Nov. 29, 2001 (JP) ........................................ 2001-363767

(51) Int. Cl.[7] .............................................. F04D 29/10
(52) U.S. Cl. ..................... 415/174.2; 415/229; 415/231
(58) Field of Search ........................... 415/174.2, 174.3, 415/174.5, 216.1, 229, 230, 231

(56) References Cited

U.S. PATENT DOCUMENTS

| | | |
|---|---|---|
| 2,662,480 A | 12/1953 | Cliborn |
| 2,749,156 A | 6/1956 | Cliborn |
| 4,824,324 A * | 4/1989 | Mitsumaru et al. ......... 415/109 |
| 4,992,023 A * | 2/1991 | Baker et al. ................. 415/231 |
| 5,482,432 A | 1/1996 | Paliwoda et al. |

FOREIGN PATENT DOCUMENTS

| | | | | |
|---|---|---|---|---|
| FR | 1 135 719 | | 5/1957 | |
| JP | 11153096 A | * | 6/1999 | ........... F04D/29/12 |

* cited by examiner

*Primary Examiner*—Edward K. Look
*Assistant Examiner*—Richard A. Edgar
(74) *Attorney, Agent, or Firm*—Jacobson Holman PLLC

(57) ABSTRACT

An antifriction bearing unit comprises a rotating shaft, an outer ring, and rolling members. The rotating shaft comprises a large-diameter shaft portion serving as an inner ring and a small-diameter shaft portion, which is hollow and has a fitting portion of increased diameter at one end thereof. The large-diameter shaft portion has an end portion fitted and fixed in the fitting portion of the small-diameter shaft portion. The fitting portion has an outward flange integral with an end thereof. The outer ring is fixedly provided with a seal member having lips slidable in contact with the flange and the outer peripheral surface of the large-diameter shaft portion, respectively.

6 Claims, 3 Drawing Sheets

ANTIFRICTION BEARING UNIT AND WATER PUMP

BACKGROUND OF THE INVENTION

The present invention relates to an antifriction bearing unit and a water pump.

Conventionally used in water pumps is an antifriction bearing unit which comprises a solid rotating shaft having a large-diameter shaft portion serving as an inner ring and a small-diameter shaft portion integral with the shaft portion, an outer ring fitted around the large-diameter shaft portion and fixed to a housing, and rolling members arranged between the large-diameter shaft portion and the outer ring. A pulley is mounted on the end (outer end) of the shaft providing the large-diameter portion, and an impeller on the other shaft end (inner end) having the small-diameter portion.

With the conventional antifriction bearing unit, the rotating shaft is solid and comprises a large-diameter portion and a small-diameter portion which are formed integrally, and therefore has the problem of being very heavy when elongated in axial length.

Further difficulties are encountered in making the large-diameter portion and the small-diameter portion integrally as by lathe turning and grinding, entailing a poor material yield and a higher cost. Since the large-and small-diameter shaft portions are made in the form of an integral piece, the small-diameter shaft portion which need not be of a rolling fatigue property must be prepared from the same bearing steel material as the large-diameter portion, and when the corrosion inhibition treatment for the small-diameter portion is to be performed also for the large-diameter portion, it becomes necessary to mask the raceway grooved portions for the treatment, hence the problem of additional difficulties and an increased cost.

Although it has been proposed to provide a hollow integral rotating shaft comprising a large-diameter portion and a small-diameter portion by making races by plastic working, there still remains the problem that preparing the entire shaft from a bearing steel results in an increased cost and difficult working even if the shaft is a hollow integral piece (see JP-A No. 2000-65070).

Additionally, the antifriction bearing unit usable in water pumps requires seal devices for assuring the bearing portion of reliable rotational performance.

However, when the antifriction bearing unit has incorporated therein a seal device comprising a metal slinger fixed to the rotating shaft by a press fit and a rubber seal member fixed in a groove formed in the outer ring as conventionally practiced, not only the number of parts corresponding to the slinger can not be reduced, but it is also impossible to reduce the number of management items for the production of the antifriction bearing unit, such as inspecting or monitoring the press-fit dimensions and pressing load involved in installing the slinger by a press fit, hence the problem of factors preventing improvements in productivity.

SUMMARY OF THE INVENTION

An object of the present invention is to provide an antifriction bearing unit and a water pump which permit a reduction in weight and an improvement in cooling effect and which are free of the problems of increased costs and difficult working.

Another object of the present invention is to provide an antifriction bearing unit and a water pump which make it possible to reduce the number of parts for use in installing a seal device in the bearing portion of the unit and to reduce the number of production management items, and in which a seal member as designed anew and having a lip slidable in contact with a flange in addition to the conventional lip slidable in contact with the outer periphery of the large-diameter shaft portion so as to obtain sophisticated resistance to muddy water can be installed easily.

The present invention provides an antifriction bearing unit comprising a rotating shaft having a large-diameter shaft portion serving as an inner ring and a small-diameter shaft portion, an outer ring fitted around the large-diameter shaft portion, and rolling members arranged between the large-diameter shaft portion and the outer ring, the antifriction bearing unit being characterized in that the small-diameter shaft portion is hollow and provided with a fitting portion of increased diameter at one end thereof, the large-diameter shaft portion having an end portion fitted and fixed in the fitting portion of the small-diameter shaft portion.

With the antifriction bearing unit of the invention, the rotating shaft can be prepared by fitting the large-diameter shaft portion into the hollow small-diameter shaft portion. The shaft can be made more easily at a lower cost than the hollow integral shaft which is made by cutting or plastic working. The length of the shaft needs to be so controlled as to adjust only an allowance for the press-fit (width of joint), so that the shaft length can be adjusted with higher accuracy and greater ease than is the case with the integral piece of a single material of uniform quality. Since the small-diameter shaft portion exerts no influence on the life of the bearing, this portion can be made from an inexpensive material with no consideration given to the rolling characteristics of this portion. Although use of an inexpensive material for the rotating shaft of an integral piece affects the life of the bearing, the shaft of the invention provides a bearing unit of long life at a low cost.

Furthermore, it is easy to make the small-diameter shaft portion from a corrosion-resistant material such as SUS material, or to surface-treat the small-diameter shaft portion only as by plating to prevent a reduction in service life due to the corrosion of the small-diameter portion. The small-diameter shaft portion, which is hollow, makes the unit lightweight and achieves an improved cooling efficiency.

With the antifriction bearing unit of the invention, the fitting portion of the small-diameter shaft portion has, for example, an outward flange integral with an end thereof, and the outer ring is fixedly provided with a seal member having at least a lip slidable in contact with the flange. Preferably, the seal member has an axial lip slidable in contact with the flange and a radial lip slidable in contact with the outer peripheral surface of the large-diameter shaft portion. The seal member is fixed to the outer ring, utilizing, for example, a seal groove formed in the inner periphery of the outer ring.

Water or dust deposit on the surface of the small-diameter shaft portion will then be centrifugally forced off by the flange which is in rotation and becomes less likely to ingress into the bearing. At the same time, the seal member fixed to the outer ring is in sliding contact with the peripheral surface of the flange to provide a seal face.

The flange integral with the small-diameter portion provides a member corresponding to a slinger, whereby a bearing seal device is provided which has an additional seal face axially of the bearing in addition to the radial seal face. The seal device therefore serves effectively under a stringent environment of which resistance to muddy water is required. Consequently, unlike the conventional bearing seal device comprising a rubber seal and slinger, the seal device of the invention makes it possible to reduce the number of components of the bearing unit and the number of management items for the production of the unit.

The flange may be in the form of a disk extending radially of the rotating shaft. The disk may be bent, curved or curled at its peripheral portion axially inward or axially outward for reinforcement so as not to deform itself uselessly, or so as to be so shaped as to produce an enhanced forcing-off effect.

The flange is opposed to the end face of the outer ring, with a small clearance formed therebetween, rendering dust or water less likely to ingress into the bearing portion and the lubricant less likely to leak.

Preferably, the seal member has lips slidable in contact with the flange and the outer peripheral surface of the large-diameter shaft portion, respectively.

The present invention further provides a water pump comprising a bearing unit having one of the foregoing features and an impeller mounted on the rotating shaft at the end thereof providing the small-diameter shaft portion.

The water pump can then be made lightweight and improved in cooling efficiency and can also be free of the problem of being costly or difficult to make.

DESCRIPTION OF THE PREFERRED EMBODIMENTS

Embodiments of the present invention will be described below with reference to the drawings.

Figure 1:
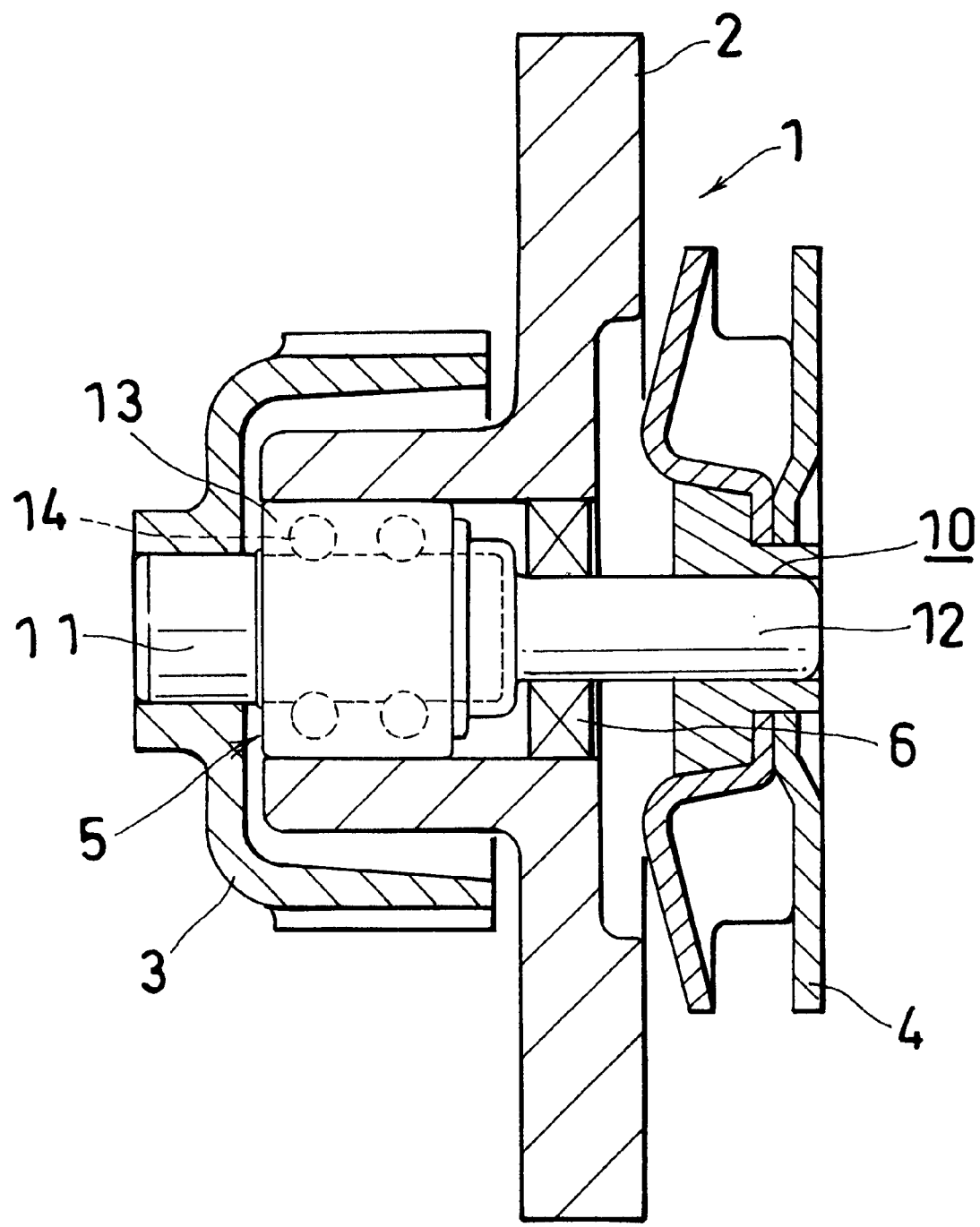
FIG. 1 is a view in vertical section showing an antifriction bearing unit and a water pump embodying the invention.

FIG. 1 shows an antifriction bearing unit and a water pump embodying the present invention. With reference to the drawing, used in a water pump 1 is an antifriction bearing unit 5 which has a rotating shaft 10 comprising a large-diameter shaft portion 11 serving as an inner ring and a small-diameter shaft portion 12, an outer ring 13 fitted around the large-diameter shaft portion 11 of the shaft 10 and fixed to a housing 2, and rolling members 14 arranged between the large-diameter shaft portion 11 and the outer ring 13. A pulley 3 is mounted on the end (outer end) of the rotating shaft 10 providing the large-diameter shaft portion. An impeller 4 is mounted on the other end (inner end) of the shaft 10 providing the small-diameter shaft portion. A mechanical seal 6 is provided in the housing 2 around the small-diameter shaft portion 12.

Figure 2:
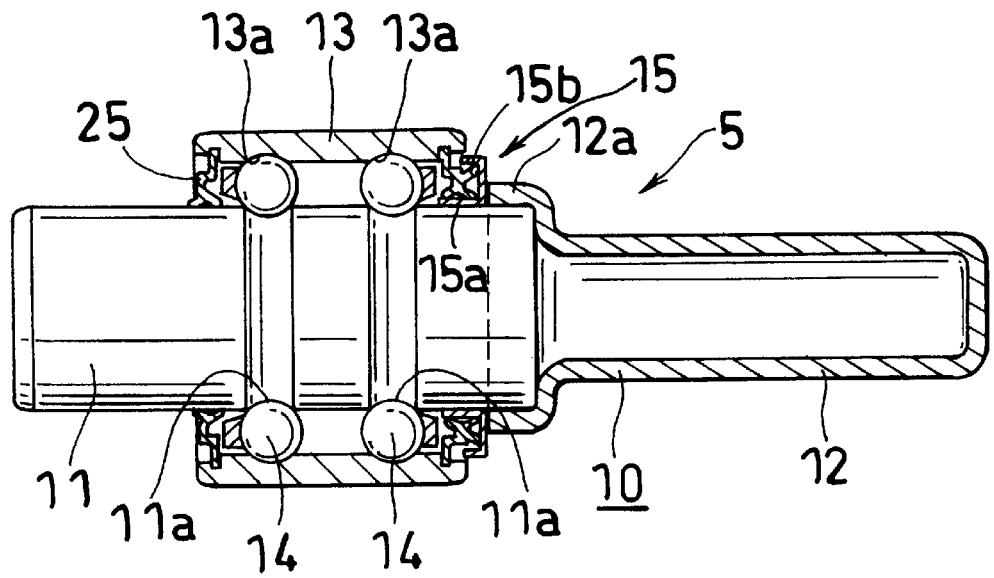
FIG. 2 is a view in vertical section showing a first embodiment of antifriction bearing unit according to the invention.

FIG. 2 shows a first embodiment of bearing unit for use in the pump of FIG. 1. With reference to this drawing, a rotating shaft 10 has a hollow small-diameter shaft portion 12, which is provided at one end thereof with a fitting portion 12a having an inside diameter approximately equal to the diameter of a large-diameter shaft portion 11. The other end of the small-diameter shaft portion 12 which is not provided with the fitting portion 12a is closed so as to be water-tight. The large-diameter shaft portion 11 of the rotating shaft 10 is made from a steel material, such as JIS SUJ-2, material or SUS440C material, which is excellent in rolling fatigue property. The shaft portion 11 is solid so as to have predetermined rigidity and has two raceway grooves 11a formed in the outer periphery thereof and spaced apart axially thereof. An outer ring 13 is also provided in its inner periphery with two raceway grooves 13a corresponding to the raceways 11a of the large-diameter shaft portion 11. Seal devices 15, 25 are provided in respective opposite ends of the outer ring 13 around the large-diameter shaft portion 11. The seal device 15 closer to the small-diameter shaft portion 12 comprises a steel slinger 15b fitted around the large-diameter shaft portion 11 by a press fit and a rubber seal member 15a fixed to the inner periphery of the end of the outer ring 13, the rubber seal member 15a slidable in contact with the slinger 15b and the outer peripheral surface of the large-diameter shaft portion 11. The other seal device 25 comprises a rubber seal member fixed to the inner periphery of the end of the outer ring 13 and having a lip slidable in contact with the outer peripheral surface of the large-diameter shaft portion 11.

The large-diameter shaft portion 11 can be formed, for example, by cutting or forging, while the small-diameter shaft portion 12 can be formed by press work.

When required, the small-diameter shaft portion 12 is made from a corrosion-resistant material such as stainless steel, and surface-treated to form a phosphate coating or corrosion-resistant plating such as chromium or nickel-chromium plating.

The large-diameter shaft portion 11 of the rotating shaft 10 is fixed to the small-diameter shaft portion 12 thereof by fitting the end of the large-diameter shaft portion 11 into the fitting portion 12a of the shaft portion 12 by a press fit. The two shaft portions may be fixed together alternatively by forcing the end of the large-diameter portion 11 into the fitting portion 12a of the small-diameter shaft portion 12 with rubber or like elastic body interposed therebetween, or by bonding or welding.

Figure 3:
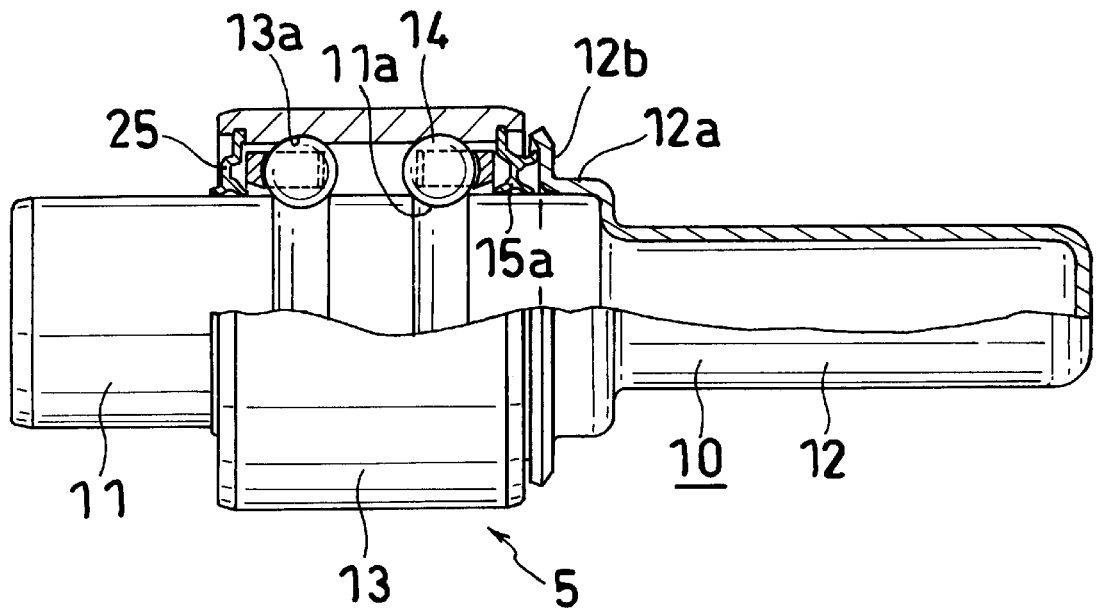
FIG. 3 is a view partly in vertical section and showing a second embodiment of antifriction bearing unit of the invention.

FIG. 3 shows a second embodiment of bearing unit for use in the pump shown in FIG. 1. The bearing unit of the second embodiment is the same as the first embodiment with the exception of the seal device to be described below and positioned closer to the small-diameter shaft portion 12. Throughout FIGS. 2 and 3, like parts are designated by like reference numerals.

Figure 4:
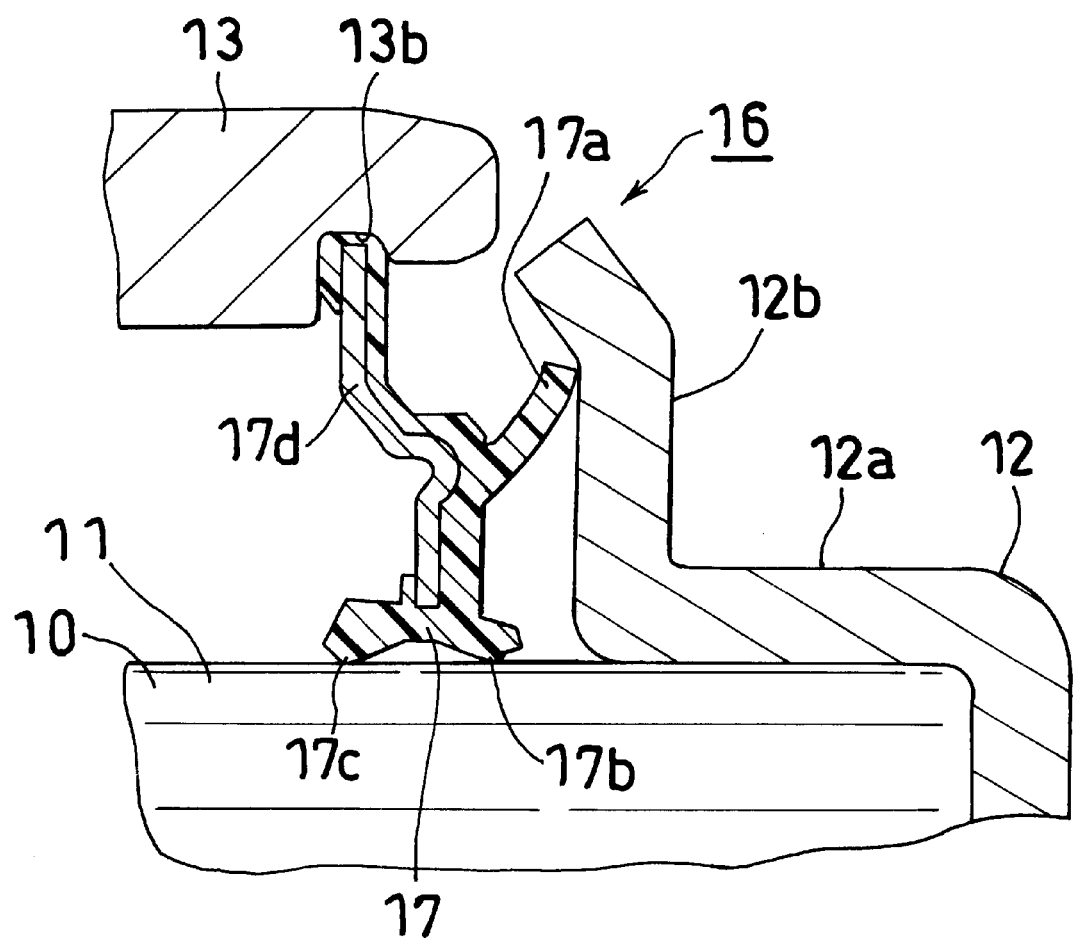
FIG. 4 is an enlarged view in vertical section showing the construction of an example of seal device for use on a rotating shaft.

FIG. 4 shows on an enlarged scale the seal device 16 positioned closer to the small-diameter shaft portion 12 in the second embodiment. With reference to FIG. 4, the fitting portion 12a of the small-diameter shaft portion 12 has an outward flange 12b formed at the end thereof opposed to the outer ring 13. A seal groove 13b is formed in the inner periphery of the end of the outer ring 13 which end is adjacent to the flange 12b. Fixed in the seal groove 13b is a rubber seal member 17 fitted on core metal 17d and having an axial lip 17a slidable in contact with the flange 12b and radial lips 17b, 17c slidable in contact with the outer peripheral surface of the large-diameter shaft portion 11. The seal device 16 positioned closer to the small-diameter shaft portion 12 is thus constructed.

According to this embodiment, the flange 12b is bent axially inward at its outer peripheral edge portion, whereas this portion may alternatively be bent axially outward or curled. The lip of the rubber seal member 17 may be made slidable in contact with the periphery of the bent edge portion.

The seal member 17 may be made of carbon or felt.

What is claimed is:

1. An antifriction bearing unit comprising a rotating shaft having a large-diameter shaft portion serving as an inner ring and small-diameter shaft portion, an outer ring fitted around the large-diameter shaft portion, and rolling members arranged between the large-diameter shaft portion and the outer ring, the antifriction bearing unit being characterized in that:

the small-diameter shaft portion is hollow and provided with a fitting portion of increased diameter at one end thereof, the large-diameter shaft portion having an end portion fitted and fixed in the fitting portion of the small-diameter shaft portion, and the large-diameter shaft portion and the small-diameter shaft portion are separate pieces that are integrally rotatable.

2. An antifriction bearing unit according to claim 1 which is characterized in that the fitting portion of the small-diameter shaft portion has an outward flange integral with an end thereof, the outer ring being fixedly provided with a seal member having at least a lip slidably in contact with the flange.

3. An antifriction bearing unit according to claim 2 which is characterized in that the seal member has an axial lip slidably in contact with the flange and a radial lip slidable in contact with an outer peripheral surface of the large-diameter shaft portion.

4. A water pump comprising an antifriction bearing unit according to any one of claims 1 to 3, and an impeller mounted on the rotating shaft at one end thereof providing the small-diameter shaft portion.

5. An antifriction bearing unit as recited in any one of claims 1, 2 or 3, wherein the large-diameter shaft portion and the small-diameter shaft portion are made of different materials.

6. A water pump comprising an antifriction bearing unit according to claim 5, and an impeller mounted on the rotating shaft at one end thereof providing the small-diameter portion.

* * * * *